(12) United States Patent
Guironnet et al.

(10) Patent No.: US 7,905,017 B2
(45) Date of Patent: Mar. 15, 2011

(54) METHOD FOR REPAIRING GUIDE RAILS OF AN ASSEMBLY RADIALLY MAINTAINING A SUPPORT PLATE OF A PRESSURIZED WATER NUCLEAR REACTOR CORE

(75) Inventors: Stephane Guironnet, Lyons (FR);
Daniel Grypczynski, Lyons (FR);
Mirco Fabris, Jouy le Moutier (FR)

(73) Assignee: Areva NP, Courbevoie (FR)

( * ) Notice: Subject to any disclaimer, the term of this patent is extended or adjusted under 35 U.S.C. 154(b) by 532 days.

(21) Appl. No.: 12/088,915

(22) PCT Filed: Sep. 6, 2006

(86) PCT No.: PCT/FR2006/002055
§ 371 (c)(1),
(2), (4) Date: Apr. 1, 2008

(87) PCT Pub. No.: WO2007/042630
PCT Pub. Date: Apr. 19, 2007

(65) Prior Publication Data
US 2010/0146759 A1    Jun. 17, 2010

(30) Foreign Application Priority Data
Oct. 4, 2005   (FR) .................................. 05 10141

(51) Int. Cl.
*B23P 6/00* (2006.01)
*G21C 1/00* (2006.01)
*G21C 13/00* (2006.01)

(52) U.S. Cl. ............. 29/890.031; 29/402.01; 29/402.04; 29/402.05; 29/402.06; 29/402.08; 29/407.05; 29/723; 376/260; 376/302

(58) Field of Classification Search ............. 29/890.031, 29/402.01, 402.04, 402.05, 402.06, 402.08, 29/402.12, 402.14, 402.15, 407.01, 407.05, 29/723; 376/260, 302, 461
See application file for complete search history.

(56) References Cited

U.S. PATENT DOCUMENTS

| 4,707,325 A | 11/1987 | Hopkins et al. |
| 5,202,082 A * | 4/1993 | Brown et al. .................. 376/260 |
| 5,550,883 A | 8/1996 | Bougis et al. |
| 5,864,594 A | 1/1999 | Balog et al. |

FOREIGN PATENT DOCUMENTS

| FR | 2717608 A | 9/1995 |
| FR | 2717608 A1 * | 9/1995 |

* cited by examiner

*Primary Examiner* — Jermie E Cozart
(74) *Attorney, Agent, or Firm* — Connolly Bove Lodge & Hutz LLP

(57) ABSTRACT

The invention concerns a method for repairing guide rails (27) of an assembly (10) radially maintaining a core supporting plate (5), which consists in measuring the spacing between the spans of the lateral branches of the guide rail (27) to be repaired, cutting and removing at least one lateral branch of said guide rail (27) to be repaired, measuring the dimensions of said lateral branch and machining with identical dimensions at least one substitution lateral branch, mounting and fixing said substitution lateral branch and measuring the spacing between the spans of the lateral branches of the repaired guide rail.

Figure 1:
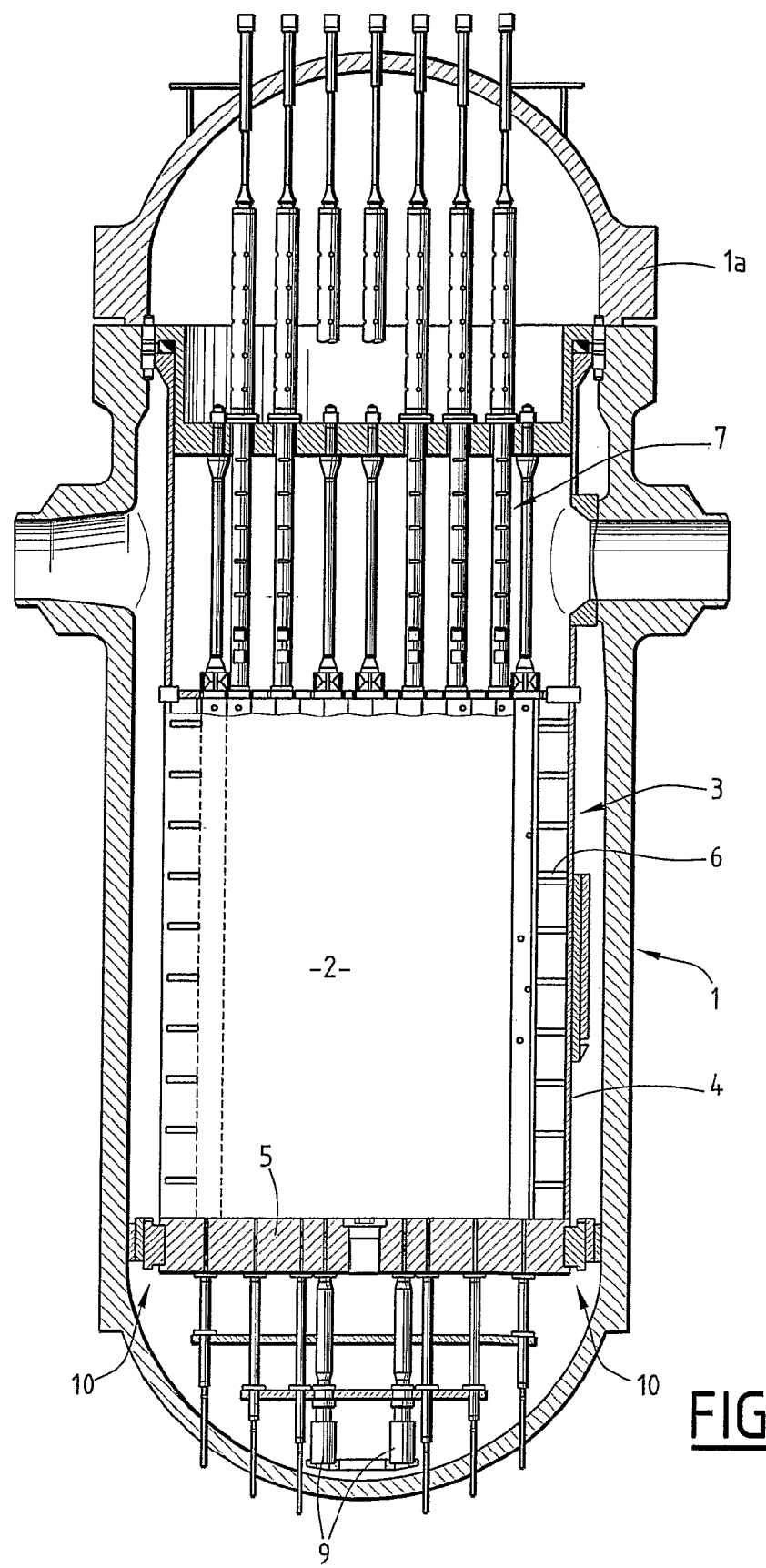

7 Claims, 5 Drawing Sheets

METHOD FOR REPAIRING GUIDE RAILS OF AN ASSEMBLY RADIALLY MAINTAINING A SUPPORT PLATE OF A PRESSURIZED WATER NUCLEAR REACTOR CORE

CROSS REFERENCE TO RELATED APPLICATIONS

This application is a National Phase filing under 35 U.S.C. §371 of PCT/FR2006/002055 filed Sep. 6, 2006, which claims priority to Patent Application No. 05 10141, filed in France on Oct. 4, 2005. The entire contents of each of the above-applications are incorporated herein by reference.

The present invention relates to a method for repairing the slides of a pressurized water reactor core support plate radial support assembly.

Pressurized water reactors comprise a vessel, the generally cylindrical barrel of which is positioned with its axis vertical when the vessel is in the service position and which is closed at its bottom by a hemispherical end.

The reactor core consisting of juxtaposed fuel assemblies is placed inside the vessel through which, while the nuclear reactor is in operation, the reactor cooling fluid flows in contact with the fuel assemblies in the core in order to cool them and carry away the heat produced by the core.

The nuclear reactor vessel contains internals known in particular as lower internals which are intended to support and hold the core assemblies inside the vessel.

These lower internals in particular comprise a cylindrical barrel positioned coaxially with the vessel and a thick core support plate secured to the lower end of the barrel.

The core barrel is suspended inside the vessel via its top and contains partitioning fixed to the interior surface of the core barrel to support the fuel assemblies which via their lower part rest against a lower core support plate.

In order to prevent the lower internals suspended from the core barrel from moving around inside the reactor vessel, use is made of devices for supporting these internals to prevent or greatly limit the movements of the lower part of the internals in radial and tangential directions.

The radial and tangential support of the lower internals is provided by support keys which limit the rotational movements of the lower internals to a very small value and prevent the lowers ends of these internals from swinging.

Radial and tangential support is obtained by means of several identical assemblies each comprising a key fixed to project from the peripheral part of the core support plate and a female part fixed to the vessel and intended, with a certain amount of clearance, to accommodate an outwardly projecting tab of the key. The female part itself comprises a solid piece welded to the internal wall of the vessel and slides for radially and tangentially supporting the key fixed to the core support plate.

The radial and tangential support device allows the lower internals to move vertically within the vessel and in particular allows the vertical movements of the lower part of the internals that results from expansion or contraction as the nuclear reactor comes up to temperature or cools down.

Thus, the role of the lower radial support device is to centre and to angularly position the lower internals in the vessel and to limit the horizontal travel of the lower internals with respect to this vessel.

To do that, each slide has a U-section and is fixed in a housing formed in a solid support integral with the reactor vessel and comprising two essentially parallel lateral branches equipped with opposing bearing surfaces designed to collaborate with the lateral faces of a corresponding radial support key fixed to the core support plate.

The surfaces facing one another and belonging to the slides and to the keys respectively are faced in stellite, an alloy generally based on cobalt, chromium, tungsten and molybdenum. This alloy is used for its resistance to wear and its ability to withstand heat.

If the clearance at the guidance between the slides and the keys of the lower radial support device is zero, this guidance does not vibrate and no wear therefore occurs.

If the clearance at this guidance is very great, there is no wear either because the guidance does not vibrate given that the opposing surfaces of the slides and of the keys are never in contact with each other.

Between these two extreme scenarios there are situations in which the opposing surfaces of the slides and of the keys knock against one another leading to wear after a certain running time.

Once the bearing surfaces of one or more slides have reached an assumed degraded state, they need to be repaired in order to bring them back to something approaching their initial condition.

One of the solutions envisaged for solving this problem of wear is to use welding or some other thermal process to reface them. Aside from the difficulties of a metallurgical nature, it becomes necessary to be able to guarantee complete elimination of the existing stellite coating. Now, machining in situ under water is not conducive to being able to ensure the necessary precision.

Another envisaged solution is to use machining to reduce the thickness of the stellite-covered bearing surfaces so that shims can be fitted in order to regain the original clearance.

However, in general the various solutions envisaged are unable to guarantee axial alignment between the support means fixed to the wall of the vessel and the support means provided on the core support plate when this core support plate is refitted.

It is an object of the invention to provide a repair method that avoids the aforementioned disadvantages and is compatible with assembly under water in an irradiated environment.

The subject of the invention is therefore a method for repairing the slides of a radial support assembly for a pressurized water reactor core support plate, each slide of U-section being fixed in a housing formed in a solid support integral with the reactor vessel and comprising two essentially parallel lateral branches equipped with opposing bearing surfaces designed to collaborate with the lateral faces of a radial support key fixed to the core support plate, characterized in that:

the separation between the bearing surfaces of the lateral branches of at least one slide that is to be repaired is measured, a relative measurement of the position of the said at least one slide that is to be repaired with respect to the other slides of the support assembly is taken, at least one lateral branch of the said at least one slide that is to be repaired is cut off and removed, the dimensions of the said at least one lateral branch are measured and at least one replacement lateral branch is machined to identical dimensions, open-ended holes intended to accept screw fasteners for screw-fastening the said at least one replacement lateral branch are pierced in the solid support, holes are pierced in the said at least one replacement lateral branch and these holes are tapped to accept the screw fasteners, the said replacement lateral branch is fixed in the housing of the solid support using the screw fasteners, the separation between the bearing surfaces of the lateral branches of at least one repaired slide is measured, a relative measurement of the position of the said at least one repaired slide with respect to the other slides of the support assembly is taken, holes are pierced in the solid support and in the said at least one replacement lateral branch for positioning and load-reacting pins, and the said pins are fitted.

According to other features of the invention:

the said at least one lateral branch is cut in the corner of the U-section of the slide that is to be repaired, the said at least one lateral branch is cut using electron discharge machining, after piercing the holes in the solid support, the said replacement lateral branch is clamped in the housing of this solid support, the holes intended to receive the screw fasteners are pierced, these holes are tapped and the said replacement lateral branch is fixed in place using the screw fasteners, the drilling of the holes in the solid support and the drilling of the holes for the screw fasteners in the said at least one replacement lateral branch are operations that are performed separately, the said replacement lateral branch is clamped in the housing of the solid support, these holes are tapped and the said replacement lateral branch is fixed in place using the screw fasteners, in order to take the measurements of the separation between the bearing surfaces of the said at least one slide that is to be repaired and of the said at least one repaired slide, and the position of this slide before and after it has been replaced, use is made of a template equipped, for each of the slides of the support assembly, with a key identical to the key of the core support plate, and at least one key of the template corresponding to a slide that does not require replacement is equipped with equipment for positioning and for measuring the position of the template with respect to the reactor vessel.

Figure 2:
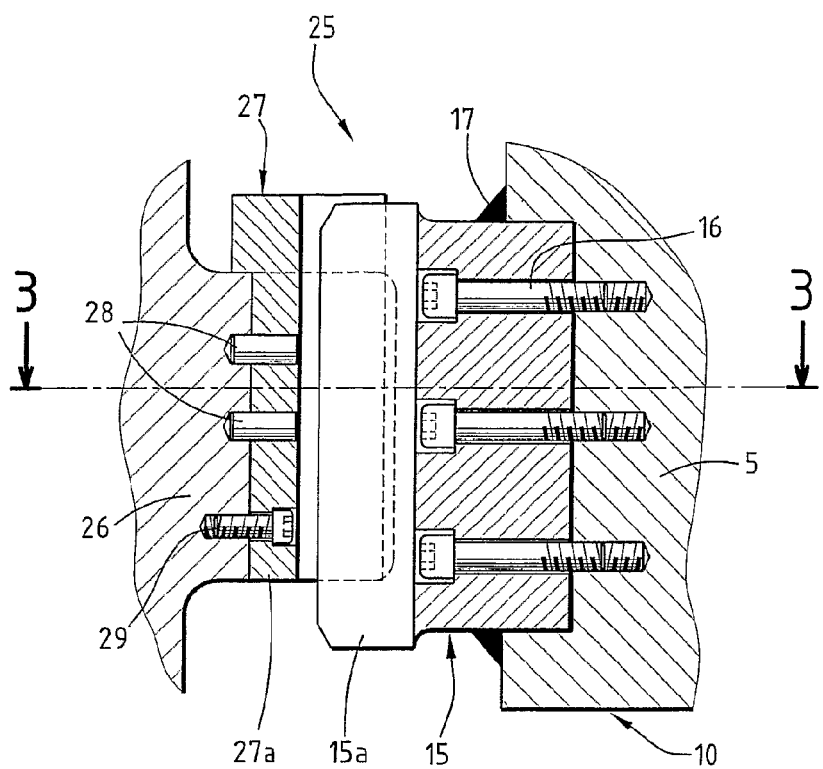
Figure 3:
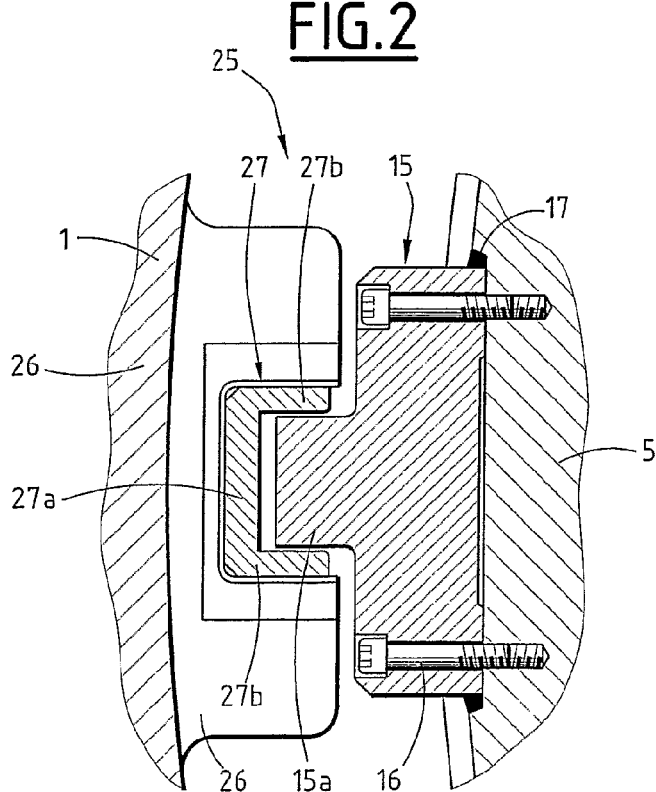
Figure 4:
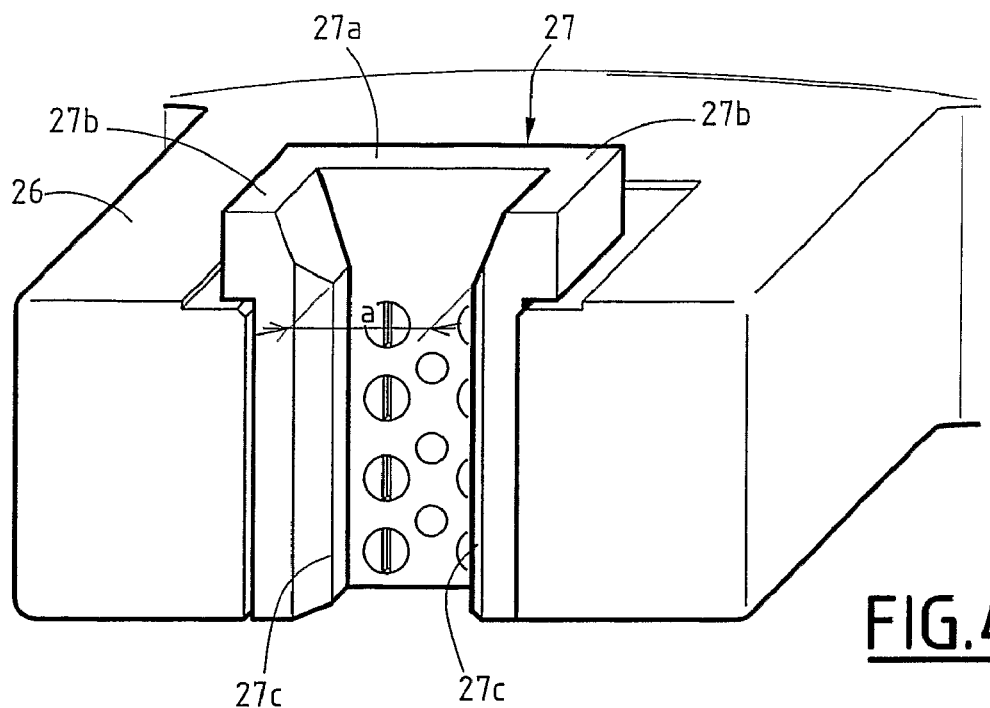
Figure 6:
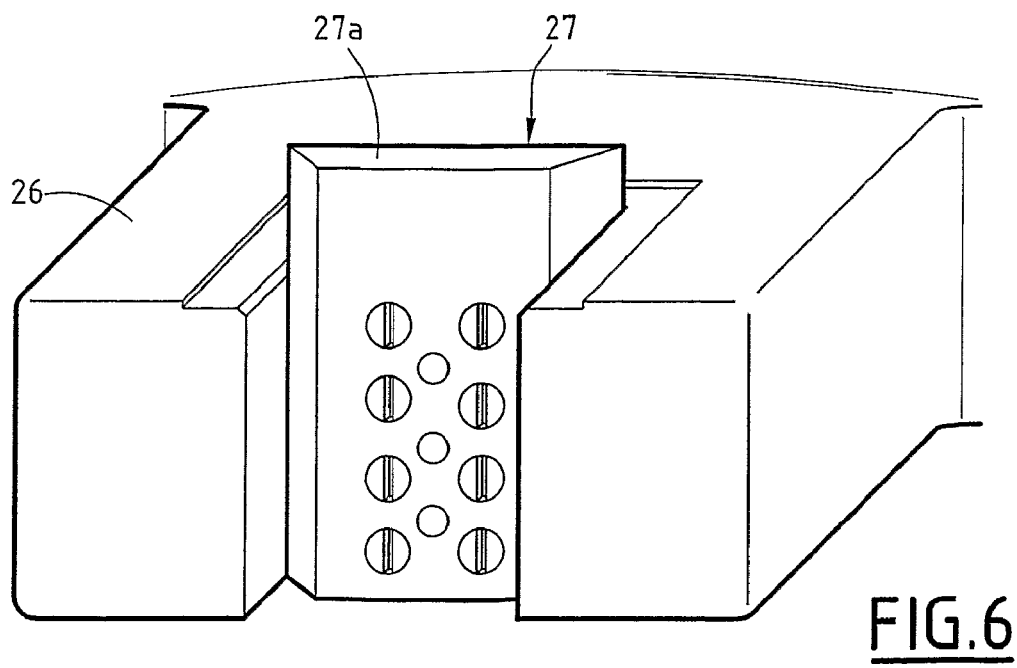
Figure 5:
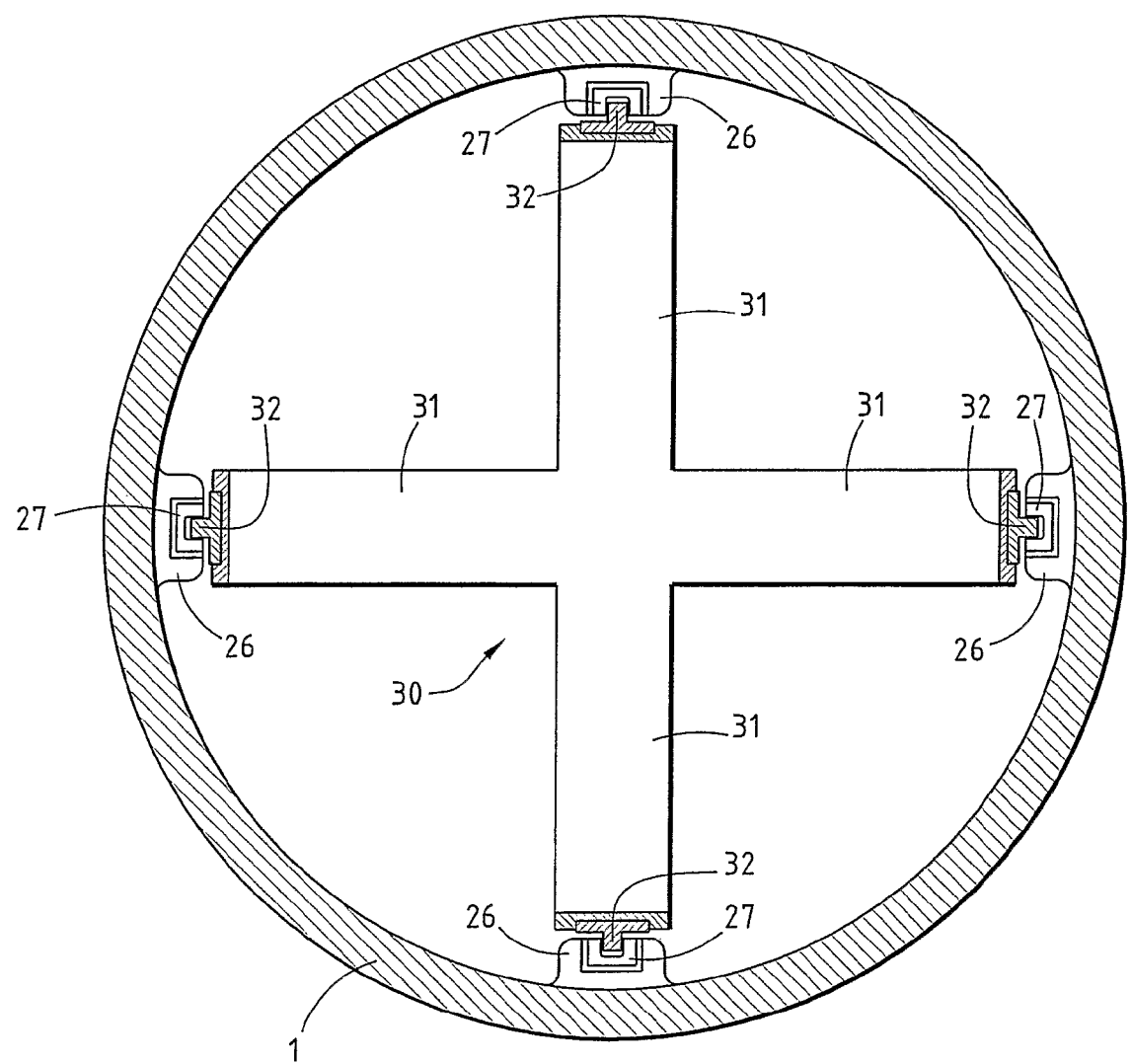
Figure 7:
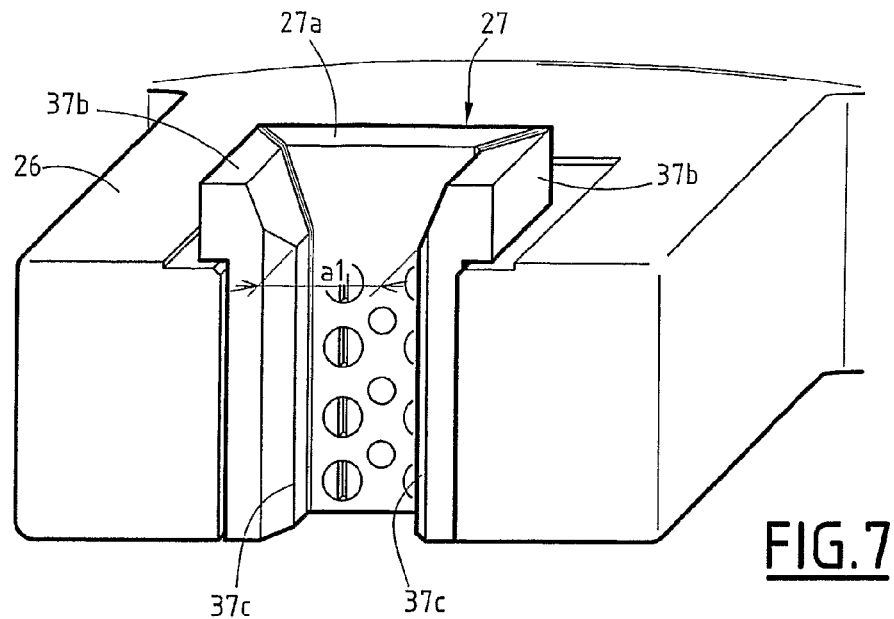
Figure 8:
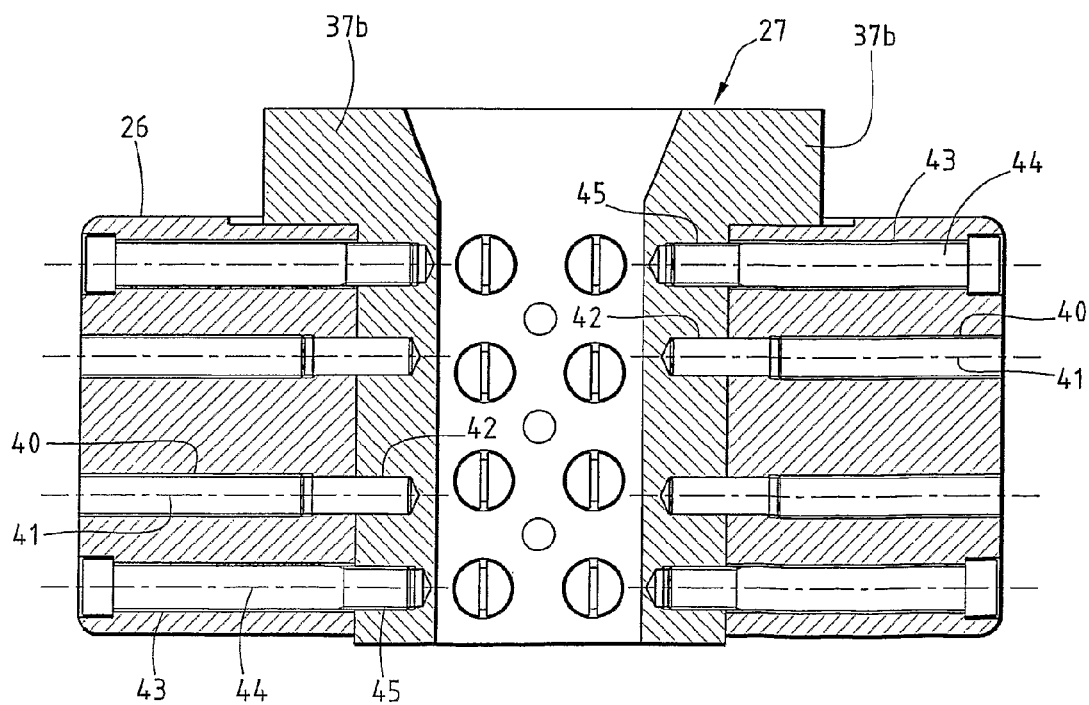

The invention will be better understood from reading the description which will follow, given by way of example and made with reference to the attached drawings, in which:

FIG. 1 is a view in axial section of a pressurized water reactor vessel with, in particular, the internals and the support means for supporting these internals, FIG. 2 is a view on a larger scale and in vertical section of an element of the radial support assembly for the vessel lower internals core support plate, FIG. 3 is a view in section on 3-3 of FIG. 2, FIG. 4 is a perspective view of a slide that is to be repaired of the core support plate radial support assembly, FIG. 5 is a schematic view from above of a template for measuring various parameters for the repair method, and FIGS. 6 to 8 are schematic views showing the various steps in the method of repairing a slide of the core support plate radial support assembly.

FIG. 1 depicts a pressurized water reactor vessel denoted by the general reference 1.

The vessel 1 is formed in the conventional way, of a barrel of cylindrical overall shape positioned with its axis vertical when the vessel is in the service position depicted in FIG. 1. Positioned inside the vessel 1 is the nuclear reactor core 2 consisting of fuel assemblies of prismatic overall shape positioned inside the internals known as lower internals denoted by the general reference 3.

The lower internals 3 in particular comprise a core barrel 4 of cylindrical overall shape positioned inside the vessel 1 coaxially with respect to this vessel 1 and a core support plate 5 secured to the core barrel 4 at its lower part.

The core barrel 4 contains partitioning 6 intended to support the assemblies at the periphery of the core 2, inside the core barrel 4.

The vessel 1 also contains upper internals 7 comprising, in particular, an upper core plate which constitutes the lower part of the upper internals 7 and rests on the upper part of the core assemblies 2 via springs, not depicted.

The upper internals and the lower internals are suspended inside the vessel via their tops which are fixed to the upper shell ring of this vessel 1 slightly below the plane where the head 1a of the said vessel 1 meets this vessel.

The lower internals are, in addition, supported at their lower part at the core support plate 5 by a radial support assembly denoted by the general reference 10. Furthermore support columns 9 are interposed between the bottom of the vessel 1 and the core support plate 5.

The radial support assembly 10 is, in the embodiment depicted in the figures, made up of four subassemblies distributed about the core support plate 5 to hold the lower internals 3 against rotational movements about their axis and against excessive radial movement of the core support plate 5, under accidental conditions, while at the same time allowing relative movements between this core support plate 5 and the core barrel 4 in the axial direction of the vessel 1, for example as a result of differential expansion.

A subassembly of the radial support assembly 10 will now be described with reference to FIGS. 2 to 4, the other subassemblies being identical.

Each subassembly of the radial support assembly 10 comprises a male first part 15 or key fixed to the external peripheral edge of the core support plate 5 and a female second part 25 fixed to the interior surface of the wall of the vessel 1, facing the male part 15.

The key 15 is fixed in place by screws 16 and welds 17, inside a flat recess machined in the external peripheral edge of the core support plate 5. The key 15 comprises at its outer end facing towards the interior surface of the wall of the vessel 1, a tab 15a of approximately parallelepipedal shape, the longitudinal axis of which runs in the vertical direction corresponding to the axis of the vessel 1 and of the core barrel 4.

The female part 25 comprises a solid support 26 fixed by welding to the interior surface of the vessel 1 and a U-shaped slide 27 fixed by positioning pegs 28 and screws 29 inside a recess of parallelepipedal shape machined in the solid support 26 also termed the M-shaped support.

As shown in FIGS. 3 and 4, the U-shaped slide 27 comprises a central branch 27a and two lateral branches 27b each equipped with a bearing surface 27c.

The tab 15a of the key 15 is housed inside the bearing surfaces 27c of the lateral branches 27b of the slide with a small amount of clearance in the circumferential direction and with a larger amount of clearance in the radial direction.

The small circumferential clearances allow the core support plate 5 and the lower internals 3 to be supported, preventing them from rotating about their axis while at the same time allowing the longitudinal movements that are required as a result of differential expansions between the lower internals and the vessel. The radial clearance allows the relative movements between the lower internals 3 and the vessel 1 to be limited under accidental conditions while at the same time preventing the lower internals 3 from becoming jammed inside the vessel 1 as a result of differential radial expansion.

The key 15 is generally made of stainless steel and the slide 27 is made of nickel alloy. The opposing surfaces of the tab 15 and of the slide 27 may be coated with a layer of a tough coating, for example of stellite.

Once the reactor has been running for a certain length of time, it may prove to be the case that one or both bearing surfaces 27c of one or both lateral branches 27b of one or more slides 27 become damaged thus requiring one or more lateral branches 27b to be replaced.

The method for repairing two lateral branches 27b of a slide 27 will now be described with reference to FIGS. 6 to 8, the method of replacing one lateral branch 27b of a slide 27 being similar.

Before repairing the lateral branches 27b of the slide 27, various measurements are taken.

According to a preferred embodiment, these measurements are taken using suitable measurement tools borne by a template denoted by the reference 30 and depicted in FIG. 5.

Other means or other appropriate devices may be used for taking the measurements.

As shown in FIG. 5, this template 30 is formed of a support, preferably in the shape of a cross comprising branches 31, equal in number to the number of slides 27 that make up the radial support assembly 10.

Thus, in the exemplary embodiment depicted in FIG. 5, the number of branches 31 is equal to four and each branch 31 at its free end comprises a key 32 which is manufactured in the likeness of the keys 15 of the radial support assembly 10. Thus, each key 32 is manufactured to be identical to the keys 15, both in terms of dimensions and in terms of geometry.

The template 30 is also equipped, at three of its keys 32, that is to say at the keys 32 that will be inserted in the slides 27 that do not need to be repaired, with equipment, not depicted, for positioning and measuring the position of the template 30 with respect to the vessel 1. The four keys 32 of the template 30 are initially mounted on this template 30 with some clearance so that they can, in terms of positioning, be adapted to suit the replacement of any slide 27 of the support 26, and therefore the four possible angular orientations of the template in the vessel 1.

When the template 30 is in position at the slides 27 of the support 26, this template 30 is clamped in place and its angular and vertical position relative to the vessel 1 is recorded at the three slides 27 that do not need to be replaced. A relative measurement of the position of the slide 27 that is to be repaired with respect to the other slides 27 of the support assembly 10 is also taken. These various measurements are used for reference for the next time the template 30 is introduced into the vessel 1. The keys 32 of the template 30 are clamped in place and remain so until the end of the operations of replacing the slide 27 that is to be repaired.

Using appropriate and known measurement tools (not depicted) borne by the key 32 of the template 30, corresponding to the slide 27 that is to be repaired, the separation "a" between the bearing surfaces 27c of the lateral branches 27b of the slide 27 that is to be repaired is measured (FIG. 4).

Having taken these various measurements, the template 30 is removed.

Next, the two lateral branches 27b of the slide 27 that is to be repaired are cut off, preferably by electron discharge machining, in the corner of the U-section of the slide 27 that is to be repaired and these two lateral branches 27b are removed, as shown in FIG. 6. Each of these lateral branches 27b which is to be replaced is measured, especially the thicknesses of these branches away from the worn regions, and each of the replacement lateral branches 37b is respectively machined to identical dimensions.

The replacement lateral branches 37b are mounted in the corresponding housing of the solid support 26 and fixed in place.

To do that, and as shown in FIG. 8, the solid support 26 is pierced with open-ended holes 40 intended to accept positioning and load-reacting pins 41 and with open-ended holes 43 for screw fasteners 44. Likewise, each of the replacement lateral branches 37b is pierced with holes, 42 for the pins 41, and 45 for the screw fasteners 44.

The drilling of the holes 43 and 45 in the solid support 26 and in each of the replacement lateral branches 37b respectively can be done in various ways.

A preferred procedure is to drill into the solid support 26, the open-ended holes 43 that are intended to accept the screw fasteners 44 and to drill the holes in each of the replacement lateral branches 37b, then to tap these holes 45 for the screw fasteners 44. Next, each of the replacement lateral branches 37b is fixed into the housing of the solid support 26 using the screw fasteners 44.

In a first procedural variant, after drilling the holes 43 in the solid support 46 for the screw fasteners 44, each of the replacement lateral branches 37b is clamped into the housing of this solid support 26, then the holes 45 are drilled in each of the replacement lateral branches 37b for the said screw fasteners 44. Next, the holes 45 in each of the replacement lateral branches 37b are tapped and these replacement lateral branches 37b are fixed in place in the housing of the solid support 26 using the screw fasteners 44.

In a second procedural variant, the holes 43 in the solid support 26 and the holes 45 in each of the replacement lateral branches 37b, which holes are intended to accept the screw fasteners 44, are drilled separately. Next, the replacement lateral branches 37b are clamped in the housing of the solid support 26, the holes 45 in each of the replacement lateral branches 37b are tapped, and these lateral branches 37b are fixed in place using the screw fasteners 44.

Having secured these replacement lateral branches 37b, the template 30 is reintroduced into the vessel 1 and positioned in the same way as it was the first time it was introduced, this being achieved by virtue of the initial measurements taken.

Next, the measurement devices borne by the template 30 are made to measure the separation $a_1$ between the bearing surfaces 37c of the replacement lateral branches 37b (FIG. 7). The separation measurement "a" is compared with the separation "$a_1$" and a check is performed to ensure that the values are similar and consistent with the theoretical values.

The check that the replacement lateral branch or branches 37b has or have been mounted correctly has to be done at an intermediate stage, that is to say when the lateral branch or branches 37b has or have been fixed in place by the screw fasteners 44, but before the pins 41 have been fitted. This is because if the check causes the branch or branches 37b to have to be removed for re-machining, only the screw fasteners 44 will then have to be removed. A final check is essential in order to validate the final condition of the repair.

If this is the case, the template 30 is removed from the vessel 1. If it is not, it is necessary to envisage re-machining one or both of the new lateral branches 37b or machining at least one other lateral branch 37b. A relative measurement of the position of the repaired slide 27 with respect to the other slides 27 is also taken.

After the repair has been validated, the positioning pins 41 are fitted.

If successive repairs are being made to several slides 27, the template 30 is pivoted through 90°, 180° or 270° between each repair operation so that the key 32 intended to take the measurements is always inserted into the slide 27 one or both of the lateral branches 27 of which are to be repaired. The four keys 32 of the template 30 are unclamped from this template 30 at the end of the repair of each slide and are clamped to the latter in the desired position at the start of each repair operation.

The template 30 allows the distance between the opposing bearing surfaces of two lateral branches to be measured simultaneously thus allowing the two lateral branches to be replaced simultaneously, thus reducing the number of operations that have to be performed.

The various measurement operations may be performed, without departing from the scope of the invention, by any other appropriate apparatus such as, for example using a laser beam. In that case, the series of operations is identical to the one described hereinabove, but the template is replaced by a suitable measurement apparatus.

In general, the cross section of the replacement lateral branches may be trapezoidal, that is to say identical to the lateral branch that is to be replaced, or, for preference, square or rectangular. In the case of replacement lateral branches of square or rectangular cross section, only the "useful" thickness dimensions are kept identical with the old branches.

The method according to the invention therefore makes it possible to repair one or more slides of a pressurized water reactor core support plate radial support assembly precisely and in accordance with the clearances, without an operator having to enter the nuclear reactor vessel.

The invention claimed is:

1. Method for repairing the slides (27) of a radial support assembly (10) for a pressurized water reactor core support plate (5), each slide (27) of U-section being fixed in a housing formed in a side support (26) integral with a nuclear reactor vessel (1) and comprising two essentially parallel lateral branches (27b) equipped with opposing bearing surfaces (27c) designed to collaborate with the lateral faces of a radial support key (15) fixed to the core support plate (5), wherein:

the separation between the bearing surfaces (27c) of the lateral branches (27b) of at least one slide (27) that is to be repaired is measured, a relative measurement of the position of the said at least one slide (27) that is to be repaired with respect to the other slides (27) of the support assembly (10) is taken, at least one lateral branch (27b) of the said at least one slide (27) that is to be repaired is cut off and removed, the dimensions of the said at least one lateral branch (27b) are measured and at least one replacement lateral branch (37b) is machined to identical dimensions, open-ended holes (43) intended to accept screw fasteners (44) for screw-fastening the said at least one replacement lateral branch (37b) are pierced in the solid support (26), holes (45) are pierced in the said at least one replacement lateral branch (37b) and these holes (45) are tapped to accept the screw fasteners (44), the said replacement lateral branch (37b) is fixed in the housing of the solid support (26) using the screw fasteners (44), the separation between the bearing surfaces (37c) of the lateral branches (37b) of at least one repaired slide (27) is measured, a relative measurement of the position of the said at least one repaired slide (27) with respect to the other slides (27) of the support assembly (10) is taken, holes (40, 42) are pierced in the solid support (26) and in the said at least one replacement lateral branch (37b) for positioning and load-reacting pins (41), and the said pins (41) are fitted.

2. Method according to claim 1, wherein the said at least one lateral branch (27b) is cut in the corner of the U-section of the slide (27) that is to be repaired.

3. Method according to claim 1, wherein the said at least one lateral branch (27b) is cut using electron discharge machining.

4. Method according to claim 1, wherein, after piercing the holes (43) in the solid support (26), the said replacement lateral branch (37b) is clamped in the housing of this solid support (26), the holes (45) are pierced, these holes (45) are tapped and the said replacement lateral branch (37b) is fixed in place using the screw fasteners (44).

5. Method according to claim 1, wherein the drilling of the holes (43) in the solid support (26) and the drilling of the holes (45) in the said at least one replacement lateral branch (37b) are operations that are performed separately, the said replacement lateral branch (37b) is clamped in the housing of the solid support (26), these holes (45) are tapped and the said replacement lateral branch (37b) is fixed in place using the screw fasteners (44).

6. Method according to claim 1, wherein, in order to take the measurements of the separation between the bearing surfaces (27c; 37c) of the said at least one slide (27) that is to be repaired and of the said at least one repaired slide, and the position of this slide (27) before and after it has been replaced, use is made of a template (30) equipped, for each of the slides (27) of the support assembly (10), with a key (32) identical to the key (15) of the core support plate (5).

7. Method according to claim 6, wherein at least one key (32) of the template (30) corresponding to a slide (15) that does not require replacement is equipped with equipment for positioning and for measuring the position of the template (30) with respect to the nuclear reactor vessel (1).

* * * * *